US007008709B2

(12) United States Patent
Keegan et al.

(10) Patent No.: US 7,008,709 B2
(45) Date of Patent: Mar. 7, 2006

(54) FUEL CELL HAVING OPTIMIZED PATTERN OF ELECTRIC RESISTANCE

(75) Inventors: Kevin R. Keegan, Hilton, NY (US); Diane M. England, Bloomfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 347 days.

(21) Appl. No.: 10/032,606

(22) Filed: Oct. 19, 2001

(65) Prior Publication Data

US 2003/0077496 A1 Apr. 24, 2003

(51) Int. Cl.
*H01M 8/04* (2006.01)

(52) U.S. Cl. ............................ 429/25; 429/30; 429/40

(58) Field of Classification Search .................. 429/25, 429/23, 22, 33, 30, 40, 8, 18
See application file for complete search history.

(56) References Cited

U.S. PATENT DOCUMENTS

| | | | |
|---|---|---|---|
| 6,230,494 B1 | 5/2001 | Botti et al. | |
| 6,423,896 B1 | 7/2002 | Keegan | |
| 6,485,852 B1 | 11/2002 | Miller et al. | |
| 6,500,574 B1 | 12/2002 | Keegan | |
| 6,509,113 B1 | 1/2003 | Keegan | |
| 6,551,734 B1 | 4/2003 | Simpkins et al. | |
| 6,562,496 B1 | 5/2003 | Faville et al. | |
| 6,608,463 B1 | 8/2003 | Kelly et al. | |
| 6,609,582 B1 | 8/2003 | Botti et al. | |
| 6,613,468 B1 | 9/2003 | Simpkins et al. | |
| 6,613,469 B1 | 9/2003 | Keegan | |
| 6,620,535 B1 | 9/2003 | Mukerjee et al. | |
| 2002/0098400 A1 * | 7/2002 | Mieney et al. | 429/22 |

* cited by examiner

*Primary Examiner*—Raymond Alejandro
(74) *Attorney, Agent, or Firm*—Paul L. Marshall

(57) ABSTRACT

A fuel cell having a non-uniform electrical resistivity over the flow area of the cell. Resistance is higher in areas of the cell having locally low levels of hydrogen than in areas having locally high levels of hydrogen. Excess oxygen ion migration and buildup is suppressed in regions having low hydrogen concentration and is correspondingly increased in regions having a surfeit of hydrogen. Destructive oxidation of the anode is suppressed and a greater percentage of the hydrogen passed into the cell is consumed, thereby increasing electric output.

1 Claim, 10 Drawing Sheets

FUEL CELL HAVING OPTIMIZED PATTERN OF ELECTRIC RESISTANCE

TECHNICAL FIELD

The present invention relates to fuel cells; more particularly, to such fuel cells having a solid oxide electrolyte; and most particularly, to such a fuel cell wherein the permeation of oxygen ions to the anode is controlled by controlling the electrical resistance of the cell non-uniformly.

BACKGROUND OF THE INVENTION

Fuel cells which generate electric current by controllably combining elemental hydrogen and oxygen are well known. In one form of such a fuel cell, an anodic layer and a cathodic layer are separated by an electrolyte formed of a ceramic solid oxide. Such a fuel cell is known in the art as a "solid oxide fuel cell" (SOFC). Either pure hydrogen or reformate is flowed along the outer surface of the anode and diffuses into the anode. Oxygen, typically from air, is flowed along the outer surface of the cathode and diffuses into the cathode. Each $O_2$ molecule is split and reduced to two $O^{-2}$ ions at the cathode/electrolyte interface. The oxygen ions diffuse through the electrolyte and combine the anode/electrolyte interface with four hydrogen ions to form two molecules water. The anode and the cathode are connected externally through the load to complete the circuit whereby four electrons are transferred from the anode to the cathode. When hydrogen is derived from "reformed" hydrocarbons, the "reformate" gas includes CO which is also converted to $CO_2$ at the anode/electrolyte interface.

A single cell is capable of generating a relatively small voltage and wattage, typically about 0.7 volts and less than about 2 watts per $cm^2$ of active area. Therefore, in practice it is usual to stack together in electrical series a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the stack. Adjacent cells are connected electrically by "interconnect" elements in the stack, and the outer surfaces of the anodes and cathodes are electrically connected to their respective interconnects by electrical contacts disposed within the gas-flow space, typically by a metallic foam or a metallic mesh which is readily gas-permeable or by conductive filaments. The outermost, or end, interconnects of the stack define electrical terminals, or "current collectors," connected across a load. For electrochemical reasons well known to those skilled in the art, an SOFC requires an elevated operating temperature, typically 750° C. or greater.

For steric reasons, fuel cells may be rectangular in plan view. Typically, gas flows into and out of the cells through a vertical manifold formed by aligned perforations near the edges of the components, the hydrogen flowing from its inlet manifold to its outlet manifold across the anodes in a first direction, and the oxygen flowing from its inlet manifold to its outlet manifold across the cathodes in a second direction.

An important limitation to improving power densities and increasing fuel utilization in a solid oxide fuel cell is localized fuel starvation in regions of the anode. The anode typically includes an active metal such as nickel (Ni). In local regions of the anode in which the concentration of hydrogen in the fuel being supplied is partially depleted, the partial pressure of $O^{-2}$ can build up because the oxygen ion mobility is enabled by a completed circuit at each local segment of the overall cell and is independent of the hydrogen concentration present. $O^{-2}$ which is not scavenged immediately by hydrogen or CO can attack and oxidize nickel in the anode.

What is needed is a means for preventing the formation of local areas of high oxygen ion concentration at the anode to protect the anode from corrosive attack.

It is a principal object of the present invention to prevent formation of a locally corrosive concentration of $O^{-2}$ at the anode of a solid oxide fuel cell.

It is a further object of the present invention to improve the overall power output of a fuel cell stack.

SUMMARY OF THE INVENTION

Briefly described, a fuel cell in accordance with the invention has a non-uniform electrical resistivity over the flow area of the cell. Resistance is higher in areas of the cell having locally low levels of hydrogen than in areas having locally high levels of hydrogen. Since the rate of oxygen ion migration through the electrolyte is inversely proportional to the resistance of the circuit at any give point in the cell, the areal pattern of resistance is shaped in inverse proportion to the steady-state hydrogen concentration. Excess oxygen ion migration and buildup is suppressed in regions having low hydrogen concentration and is correspondingly increased in regions having a surfeit of hydrogen. Thus, destructive oxidation of the anode is prevented and a greater percentage of the hydrogen passed into the cell is consumed, thereby increasing electric output.

In a first embodiment, the chemical composition of the anode or cathode itself is varied regionally to increase conductivity in regions of high hydrogen concentration and to decrease conductivity in hydrogen-poor regions.

In a second embodiment, the porosity of the cathode is varied to reduce or increase the permeability of oxygen through the cathode to coincide with the areas of low and high hydrogen concentrations.

In a third embodiment, the spatial density of conductive fibers extending between the anode and the interconnect or between the cathode and the interconnect is varied in direct proportion to the hydrogen concentration pattern in the cell.

In a fourth embodiment, the interconnects or current collectors are embossed in an areal pattern of protrusions to provide an areal pattern of contact points, resulting in a resistance gradient in accordance with the invention by providing an inverse conductivity gradient.

In a fifth embodiment, the anode surface or the mating interconnect surface is partially covered with dielectric material, as by a graded half-tone screen, or by thermal or plasma spraying, to provide an areal pattern of contact points, resulting in a resistance gradient between the areas of high hydrogen concentration and the areas of low hydrogen concentration.

In a sixth embodiment of the invention, the cathode or anode surface or the corresponding interconnect surface is covered with a wedge of dielectric material, the thickness of the layer being graded to provide a resistance gradient between the areas of high hydrogen concentration and the areas of low hydrogen concentration.

In a seventh embodiment of the invention, the thickness of the electrolyte element is varied to provide a resistance gradient between the areas of high hydrogen concentration and the areas of low hydrogen concentration.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
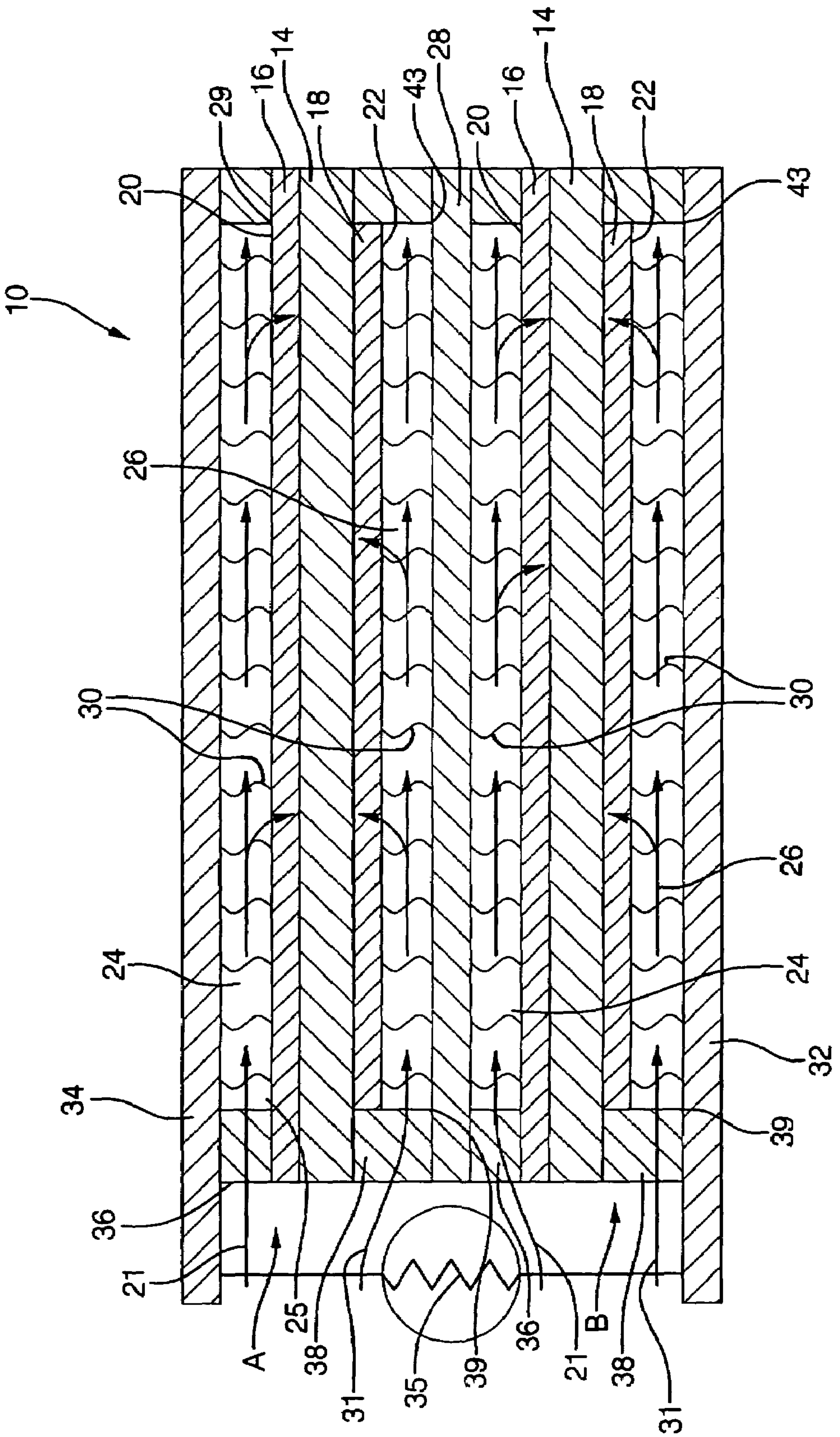
FIG. 1 is a schematic cross-sectional view of a two-cell stack of solid oxide fuel cells in accordance with the invention.

Referring to FIG. 1, a fuel cell stack 10 includes elements normal in the art to solid oxide fuel cell stacks comprising more than one fuel cell. The example shown includes two fuel cells A and B, connected in series, and is of a class of such fuel cells said to be "anode-supported" in that the anode is a structural element having the electrolyte and cathode deposited upon it. Element thicknesses as shown are not to scale.

Each fuel cell includes an electrolyte element 14 separating an anodic element 16 and a cathodic element 18. Each anode and cathode is in direct chemical contact with its respective surface of the electrolyte, and each anode and cathode has a respective free surface 20,22 forming one wall of a respective passageway 24,26 for flow of gas across the surface. Anode 16 of fuel cell B faces and is electrically connected to an interconnect 28 by filaments 30 extending across but not blocking passageway 24. Similarly, cathode 18 of fuel cell A faces and is electrically connected to interconnect 28 by filaments 30 extending across but not blocking passageway 26. Similarly, cathode 18 of fuel cell B faces and is electrically connected to a cathodic current collector 32 by filaments 30 extending across but not blocking passageway 26, and anode 16 of fuel cell A faces and is electrically connected to an anodic current collector 34 by filaments 30 extending across but not blocking passageway 24. Current collectors 32,34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32. Spacers 36,38 also serve to seal the perimeter of the stack against gas leakage and may be augmented by seals 37 (FIG. 2) specifically formulated for sealing against the surface of electrolyte 14; for example, compressed phlogopite mica can form an excellent gas seal.

Figure 2:
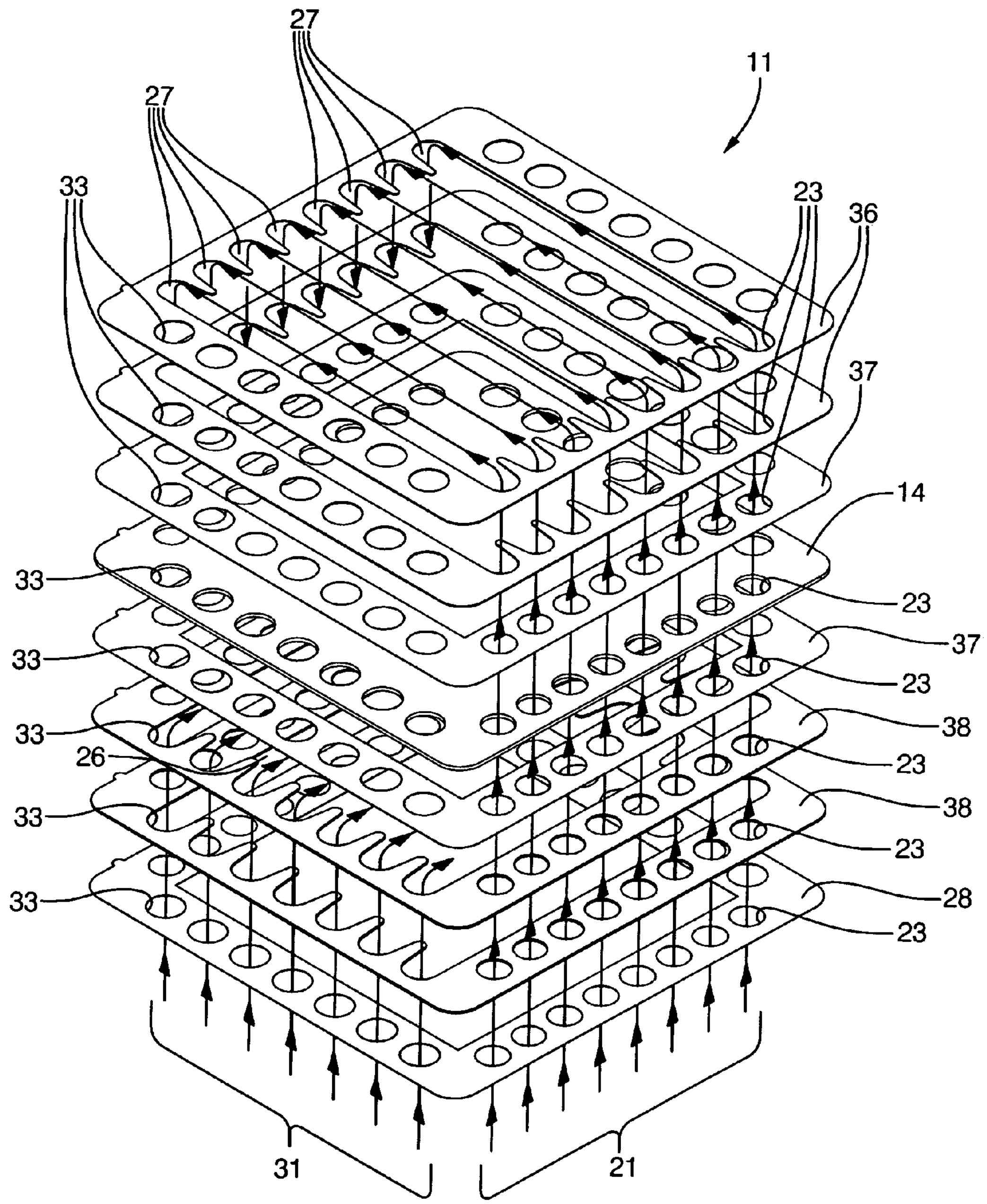
FIG. 2 is an exploded isometric view of a single solid oxide fuel cell, showing the various elements.
Figure 3:
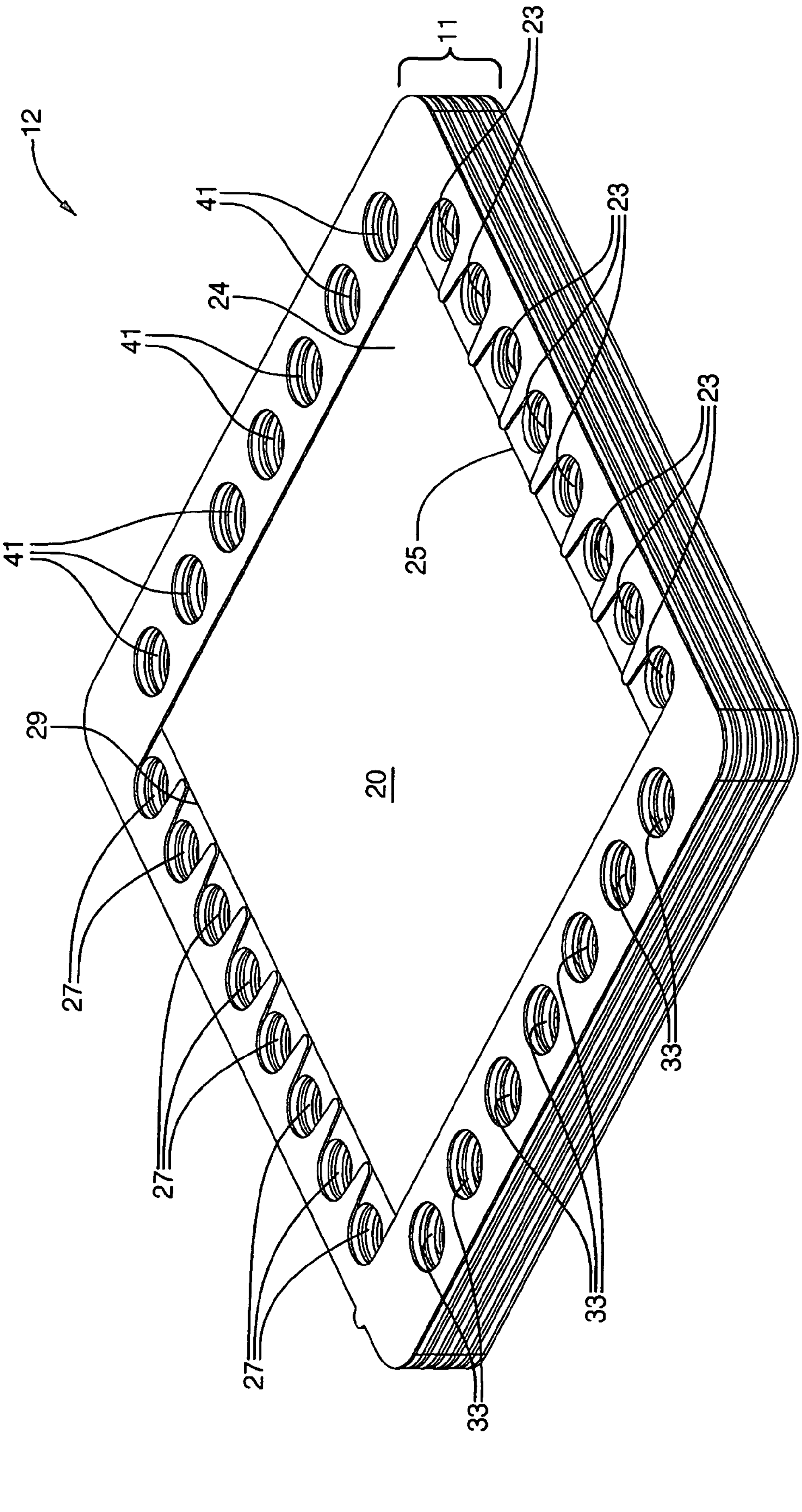
FIG. 3 is an isometric view of a fuel-cell stack comprising five cells like the cell shown in FIG. 2.
Figure 4:
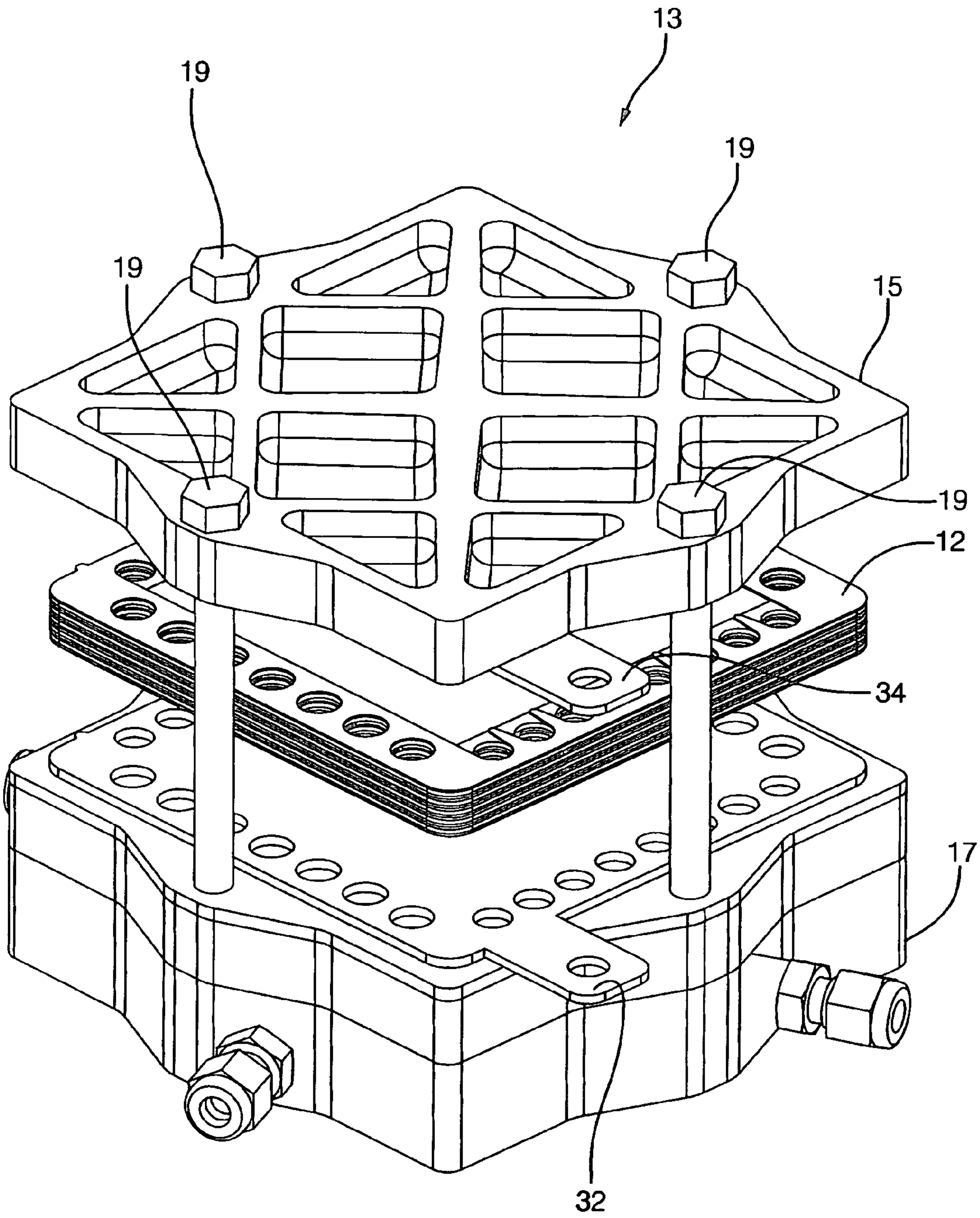
FIG. 4 is an isometric view like that shown in FIG. 3, partially exploded, showing the addition of current collectors, end plates, and bolts to form a complete fuel cell stack ready for use.

Referring to FIGS. 2 through 4, a plurality of individual fuel cells 11 may be stacked together to form a stack 12 (FIGS. 3 and 4) similar to schematic stack 10 shown in FIG. 1. Stack 12 comprises five such cells. To form a complete working fuel cell assembly 13 (FIG. 4), stack 12 is sandwiched between an anodic current collector 34 and a cathodic current collector 32 which in turn are sandwiched between a top plate 15 and a gas-manifold base 17, the entire assembly being sealingly bound together by bolts 19 extending through bores in top plate 15 and threadedly received in bores in base 17.

Preferably, the interconnect and the current collectors are formed of an alloy which is chemically and dimensionally stable at the elevated temperatures necessary for fuel cell operation, generally about 750° C. or higher, for example, Hastelloy. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed, for example, of a mixture of nickel and YSZ.

Referring to FIGS. 1 and 2, in operation, hydrogen or reformate gas 21 is provided via supply conduits 23 to passageways 24 at a first edge 25 of the anode free surface 20, flows parallel to the surface of the anode across the anode in a first direction, and is removed via exhaust conduits 27 at a second and opposite edge 29 of anode surface 20. Hydrogen (and CO if the fuel gas is reformate) also diffuses into the anode to the interface with the electrolyte. Oxygen 31, typically in air, is provided via supply conduits 33 to passageways 26 at a first edge 39 of the cathode free surface 22, flows parallel to the surface of the cathode in a second direction orthogonal to the first direction of the hydrogen, and is removed via exhaust conduits 41 at a second and opposite edge 43 of cathode surface 22. Molecular oxygen gas ($O_2$) diffuses into the cathode and is catalytically reduced to two $O^{-2}$ ions by accepting four electrons from the cathode and the cathodic current collector 32 (cell B) or the interconnect 28 (cell A) via filaments 30. The electrolyte is permeable to the $O^{-2}$ ions which pass through the electrolyte and combine with four hydrogen atoms to form two water molecules, giving up four electrons to the anode and the anodic current collector 34 (cell A) or the interconnect 28 (cell B) via filaments 30. Thus cells A and B are connected in series electrically between the two current collectors, and the total voltage and wattage between the current collectors is the sum of the voltage and wattage of the individual cells in a fuel cell stack.

Figure 5:
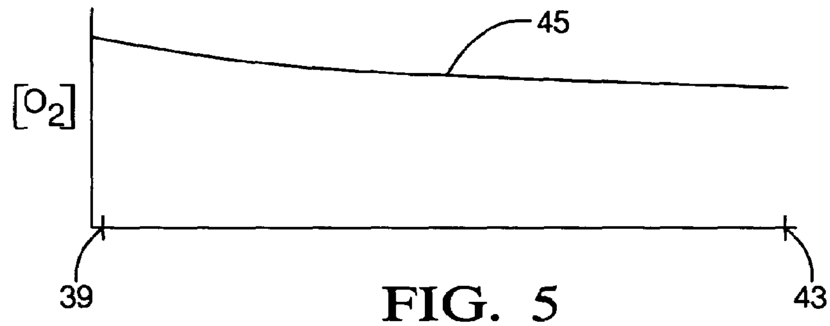
FIG. 5 is an idealized graph showing concentration of oxygen as air flows through a fuel cell from an entrance to an exit.
Figure 6:
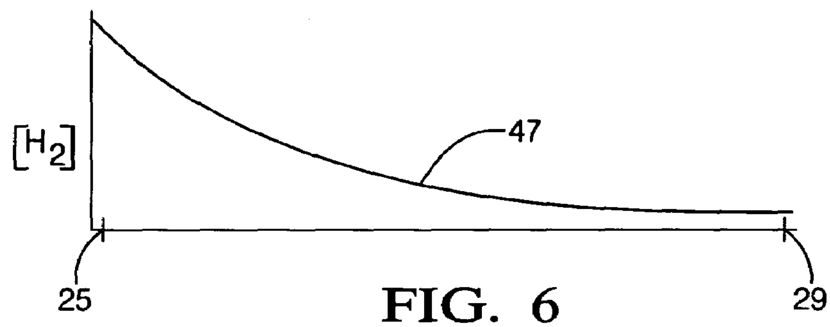
FIG. 6 is an idealized graph showing concentration of hydrogen as reformate flows through a fuel cell from an entrance to an exit.

FIGS. 5 and 6 illustrate graphically the reason for a practical problem that is well known in the construction and operation of rectangular fuel cell stacks such as stack 12. The cathode side of a fuel cell typically is flooded with an excess of oxygen in the form of air; thus, the concentration 45 of oxygen in air decreases only slightly as the air passes across the surface of a cathode from entrance 39 to exit 43, as shown in FIG. 5. However, on the anode surface, reformate fuel gas is metered across the electrode surface at a relatively low rate of flow, ideally but not practically at a flow rate sufficiently low that all the fuel is consumed by the cell and none is passed through. At such low flow rates, as shown in FIG. 6, there can be a much higher concentration 47 of hydrogen in reformate at the entrance to the cell and a significant reduction as the reformate proceeds along the anode from entrance 25 to exit 29. An added complexity is that the reformate and oxygen are flowing orthogonally to each other. Thus, the ratio of partial pressure of hydrogen over the anode to partial pressure of oxygen over corresponding areas of the cathode may vary widely, perhaps by orders of magnitude. If oxygen ion is caused to migrate through the electrolyte nearly uniformly over the areal extent of the anode, as occurs in prior art fuel cell stacks, regions of high hydrogen concentration may be starved for oxygen, and regions of low hydrogen concentration may have an undesirably high level of oxidizing-promoting oxygen ion.

Known approaches to remedying this problem involve either using pressure gradients to cause the flow to be more uniform and/or providing aerodynamically improved entry and exit manifolding to expand and contract the flow smoothly. The former approach is undesirable because it results in reduced system efficiency due to pressure increase in the fuel flow, and the latter approach is undesirable because it requires very substantial increase in the size and shape of the stack to accommodate the smoothing manifolds.

The problem may be remedied in accordance with the present invention by any of a number of physical and/or chemical configurations as described below, all of which act to prevent the buildup of unacceptably high $O^{-2}$ ion concentrations and to promote additional consumption of hydrogen by areally varying or grading the electrical resistance of the cell.

In a first embodiment, the chemical composition of either the cathode or the anode itself is varied regionally to increase or decrease local conductivity. The cathode comprises, for example, a chemical composition of lanthanum strontium manganate of lanthanum strontium iron. In the embodiment, the atomic proportion of lanthanum to strontium in the composition is varied across the cathode non-uniformly so that the atomic proportion is increased in regions of the cathode where high concentrations of hydrogen are found to exist. For example, in areas of high hydrogen concentration where greater conductivity is desired, the atomic proportion of lathanum to strontium may by 80% to 20%, respectively, while in areas of low concentration, the proportion would be reversed. The chemical composition of the anode can also be varied. The anode comprises a mixture of a conductive material, for example, nickel, and a dielectric material, for example YSZ. The nickel percentage is varied non-uniformly to provide more nickel, and hence greater conductivity, in regions of high hydrogen concentration and less nickel, and hence lesser conductivity, in hydrogen-poor regions.

Figure 7:
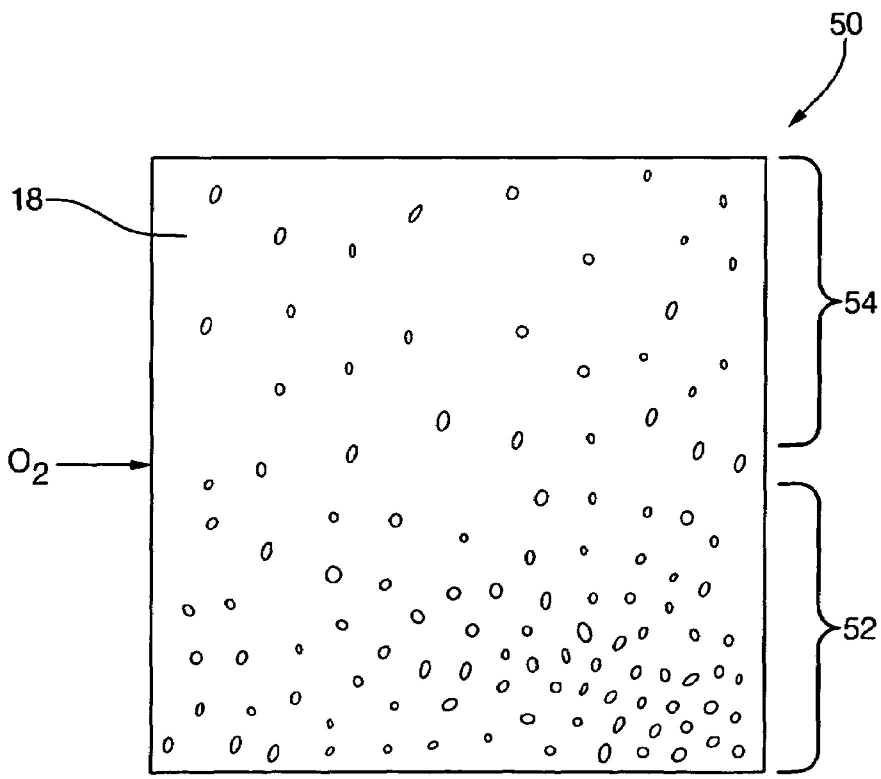
FIG. 7 is a plan view of a cathode in accordance with the invention showing varied porosity of the cathode.

In a second embodiment 50 referring to FIG. 7, the porosity of the cathode can be varied so as to affect the permeability of the oxygen through the cathode. In regions of high hydrogen concentration, the cathode is made more porous 52 so that more oxygen passes therethrough; in regions of low hydrogen concentration the cathode is made less porous 54 so that less oxygen passes therethrough.

Figure 8:
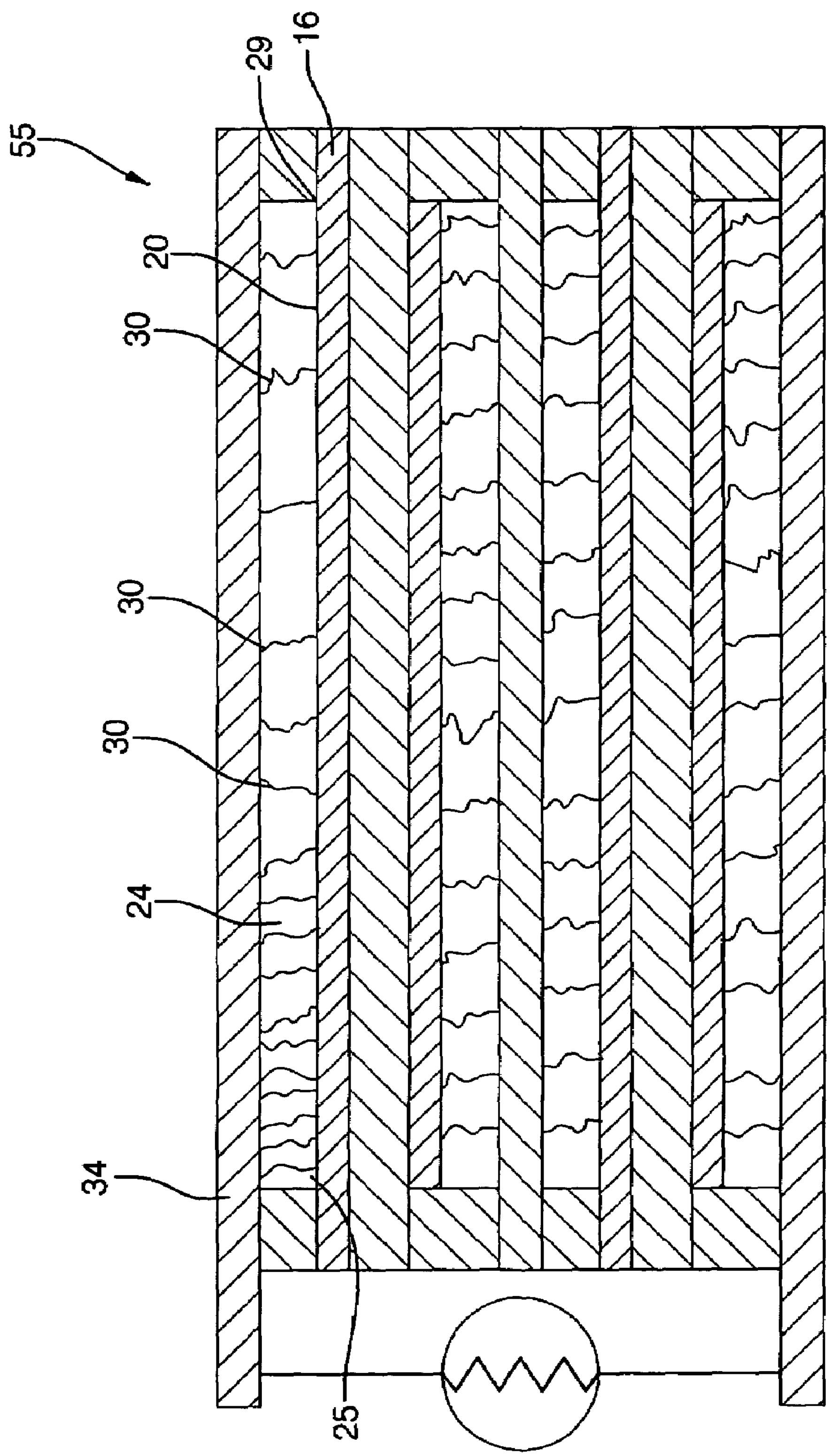
FIG. 8 is a schematic cross-sectional view like that shown in FIG. 1, showing a graded spacing-density of conductive filaments between the anode and the anode current collector to provide graded conductivity, and hence inversely resistivity, to electric flow across the cell.

In a third embodiment 55, referring to FIG. 8, the spatial density of conductive filaments 30 extending through reformate flow space 24 between the surface 20 of anode 16 and anode current collector 34 is varied in direct proportion to the hydrogen concentration pattern in the cell. In the example shown, filaments 30 are less numerous and spaced farther apart in the direction of reformate flow from the entrance 25 to the exit 29. The maximum thickness and the proper thickness gradient and distribution for a given fuel cell stack are readily determinable empirically without undue experimentation.

Figure 9:
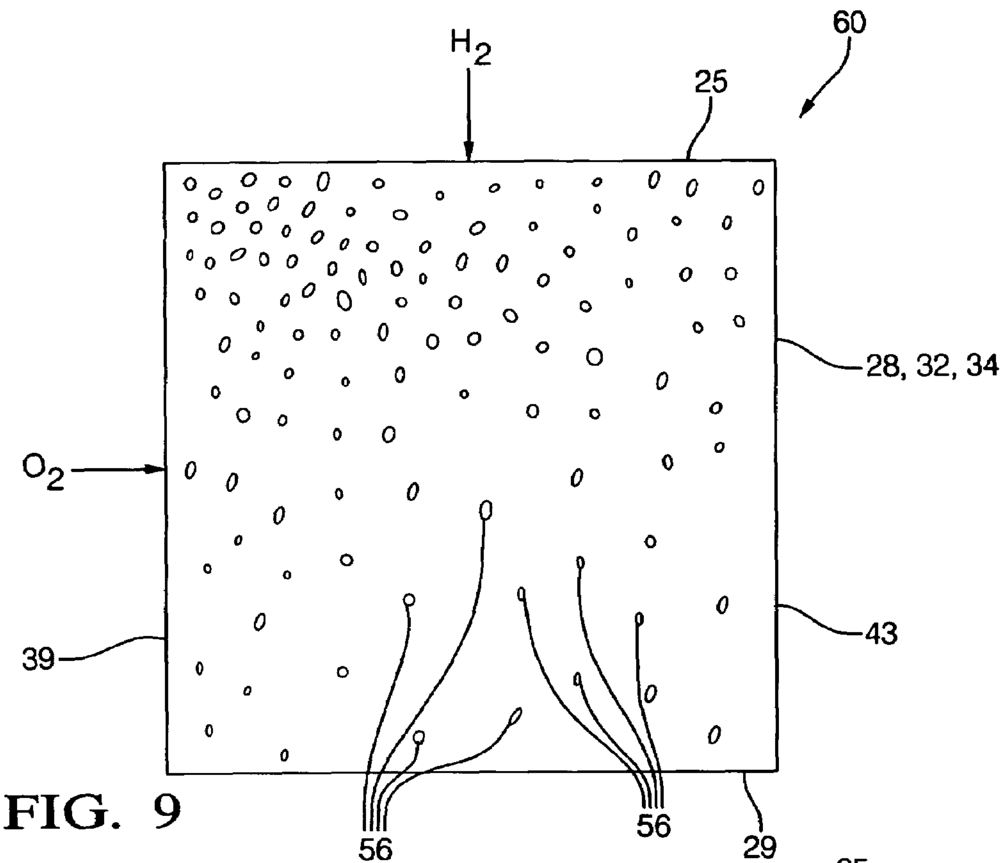
FIG. 9 is a plan view of the graded distribution of conductivity points in accordance with the invention for a fuel cell having orthogonal oxygen and hydrogen distributions as shown in FIGS. 5 and 6.

In a fourth embodiment 60, referring to FIG. 9, the interconnects 28 or current collectors 32,34 are embossed in a pattern of protrusions 56 which extend above the planar surface of the element to provide an areal pattern of conductive contact points with an anode or cathode, resulting in a resistance gradient in accordance with the invention by providing an inverse conductivity gradient.

Figure 10:
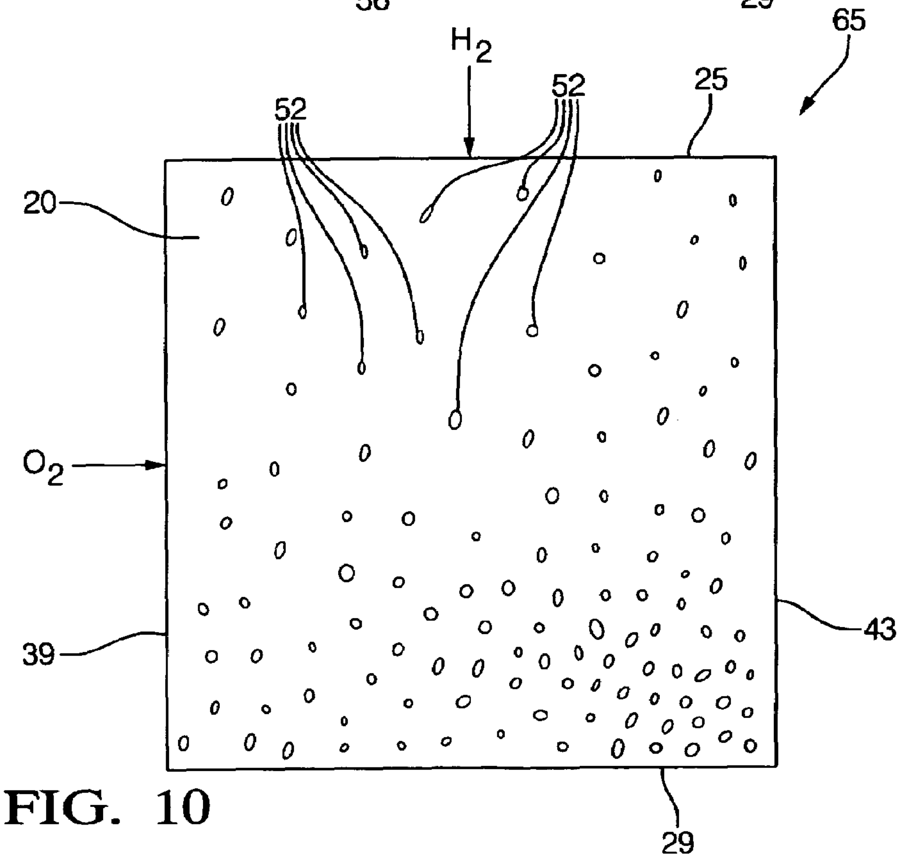
FIG. 10 is a plan view of the graded distribution of resistivity regions in accordance with the invention for a fuel cell having orthogonal oxygen and hydrogen distributions as shown in FIGS. 5 and 6.

In a fifth embodiment 65, referring to FIG. 10, the free surface, shown as anode surface 20, of any electrical element forming a gas flow space bridged by filaments (anode, cathode, interconnect, or current collector) is partially covered with dielectric material to provide an areal pattern of non-conductivity (high resistance) regions 52 in which filaments are unable to make electrical contact, resulting in a resistance gradient between the areas of high hydrogen concentration and the areas of low hydrogen concentration. Again, a dielectric such as a glass, for example, YSZ, may be screen printed onto the substrate, or non-uniformly applied to the substrate by thermal or plasma spraying, by techniques well known in the art. The net effect is to disable a pattern of filaments in regions of low hydrogen concentration, which is functionally the same as spacing active filaments farther apart, as shown in third embodiment 48.

Figure 11:
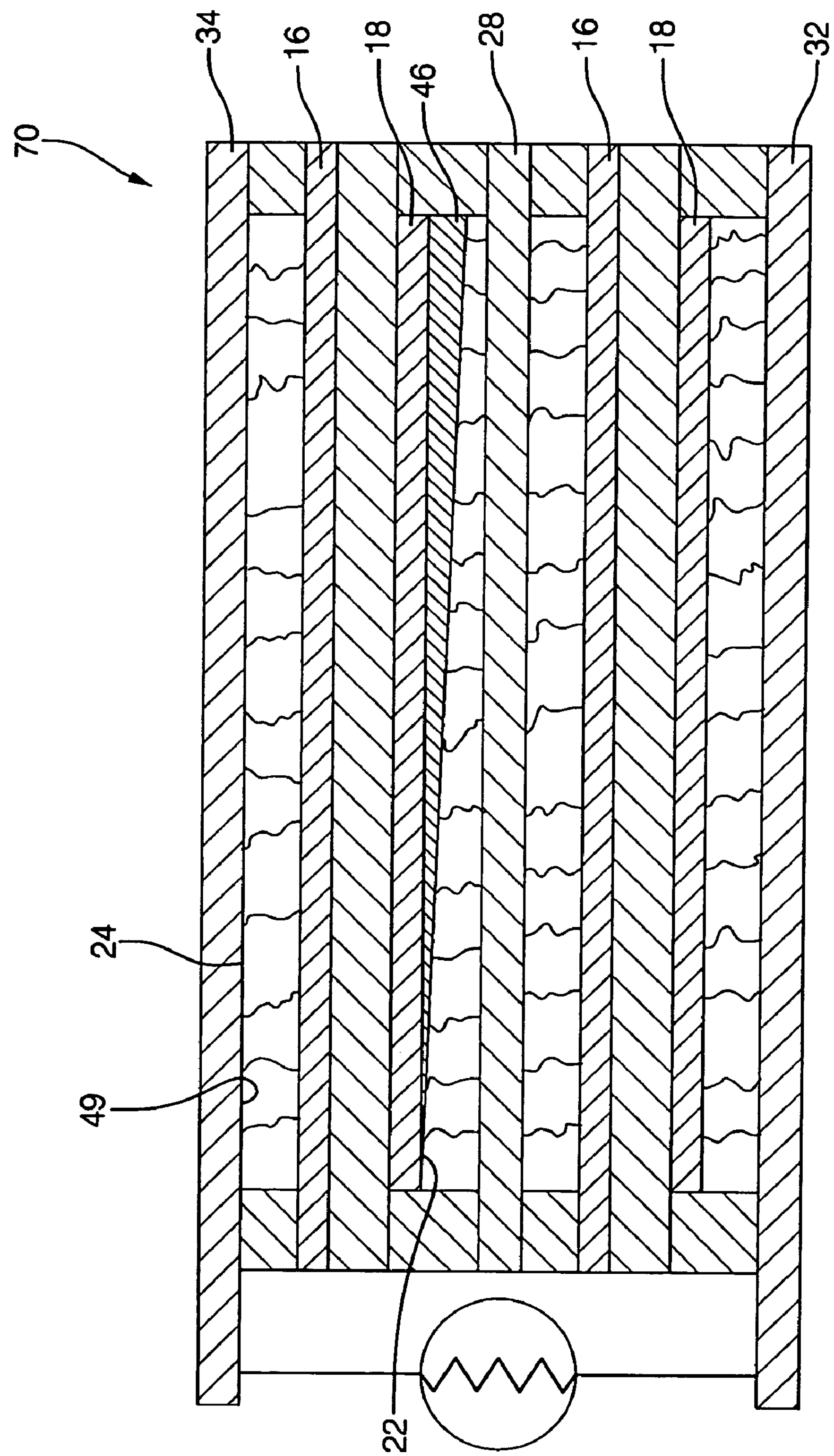
FIG. 11*a* is a schematic cross-sectional view like that shown in FIG. 1, showing a variable-thickness dielectric layer applied to the cathode current collector to provide graded resistivity to electric flow across the cell.
FIG. 11*b* is a schematic cross-sectional view like that shown in FIG. 11*a*, showing a variable-thickness dielectric layer applied to the cathode itself.
FIG. 11*c* is a schematic cross-sectional view like that shown in FIG. 1, showing a variable-thickness dielectric layer applied to the anode itself.
Figure 11:
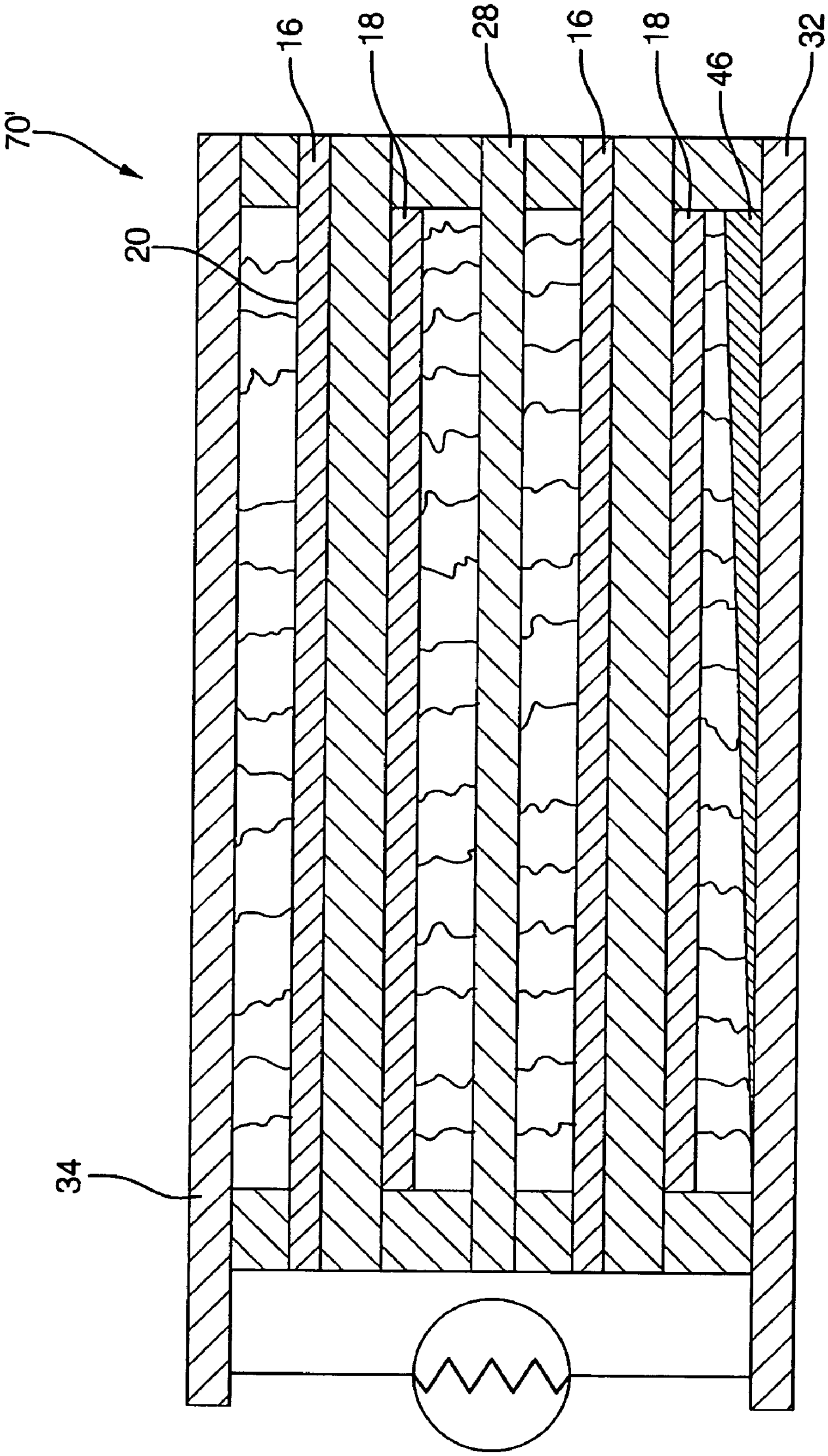
Figure 11:
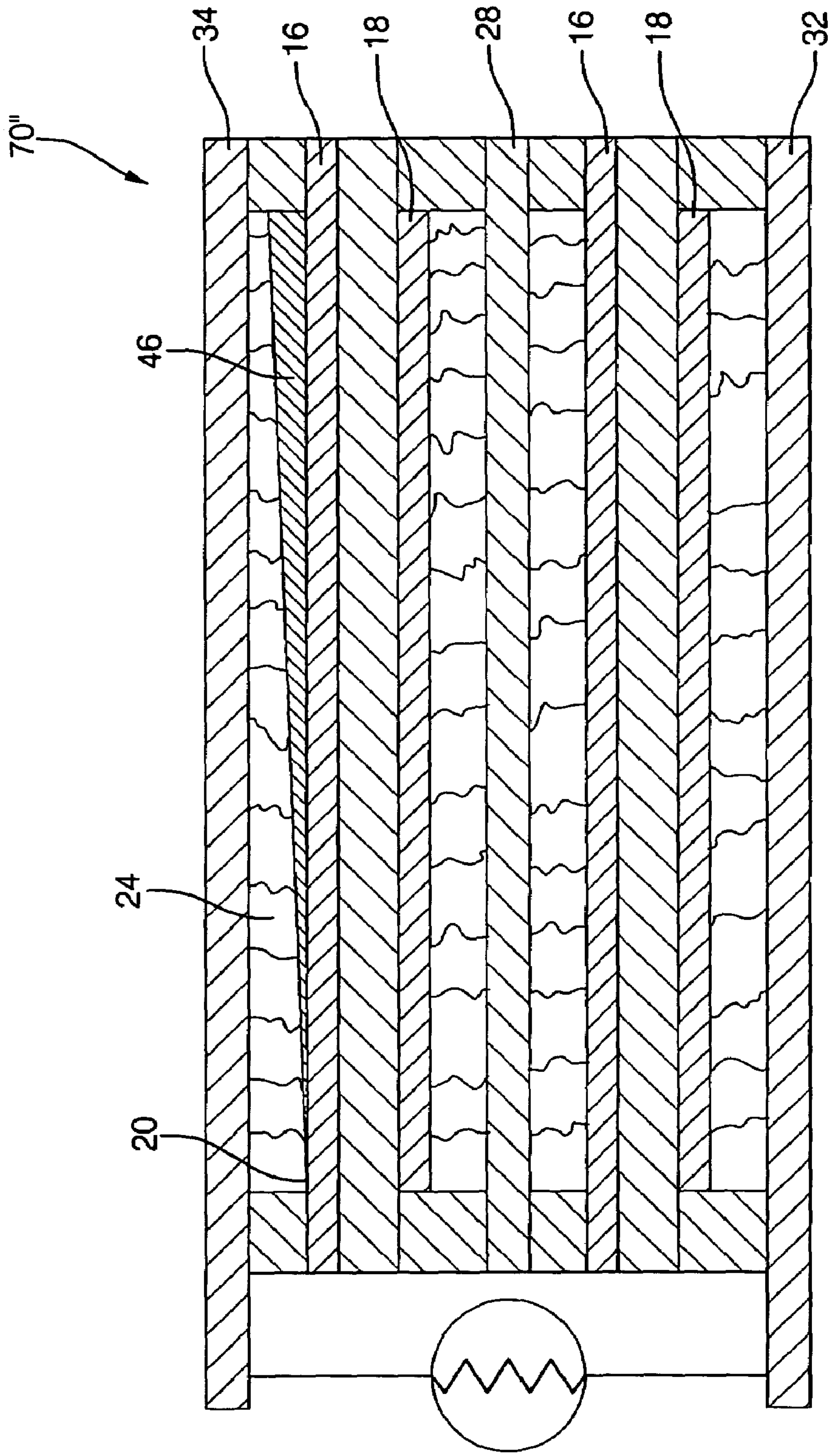

In a sixth embodiment 70, 70' of a fuel cell in accordance with the invention, referring to FIGS. 11*a*. and 11*b*., the cathode surface 22 or the corresponding interconnect or current collector surface 32 is partially covered with a wedge 46 of dielectric material, the areal extent and thickness of layer 46 being graded to provide a resistance gradient between the areas of high hydrogen concentration and the areas of low hydrogen concentration. The wedge thickness shown in FIGS. 11*a*. and 11*b*. is greatly exaggerated for clarity of presentation. In actuality, the thickness need be from one to only a few atoms of an easily applied and controlled dielectric material, for example, YSZ or other glass. The maximum thickness and the proper thickness gradient and distribution for a given fuel cell stack are readily determinable empirically without undue experimentation. Of course, the wedge may be applied with equal effect to any conductive element anywhere in stack 70", for example, as shown in FIG. 11*c*, to the free surface of either anode 20 (shown), interconnect 28, or the anode current collector 34.

Typically, the thickness of the electrolyte element is approximately 1 micron. In a seventh embodiment, the thickness of the electrolyte element is varied regionally to increase or decrease local conductivity. Where areas of low hydrogen concentration exists, the electrolyte is made thicker to decrease conductivity, and vice versa. The proper thickness gradient for a given fuel cell stack are readily determinable without undue experimentation.

Techniques for forming the dielectric deposits on the anodes, cathodes, interconnects, and current collectors, for varying the thickness of the electrolyte element, for forming protrusions on the interconnects and current collectors, and for varying the nickel content of the anodes, or the atomic proportions of the lanthanum and strontium of the cathode in the embodiments just recited are well within the skill of one skilled in the art of fuel cell manufacture; therefore, such techniques need not be recited here.

Also, in the embodiments shown herein, the cathode element has been described as comprising lanthanum strontium manganate or lanthanum strontium iron. It is understood that the cathode element can be comprised of other chemical compositions known in the art to which the composition can be varied to impart a localized affect on the conductivity of the cathode.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell for generating an electric current by combining hydrogen and oxygen wherein resistance to the flow of electric current through the cell is non-uniform over a flow area of the cell to regulate the flow of oxygen ions through any region of said cell in proportion to the partial pressure of hydrogen in said region, said fuel cell further comprising:

a) an anode for reacting hydrogen ions with said oxygen ions, said hydrogen ions being derived from gaseous molecular hydrogen flowing in a first flow path through a first portion of said cell;

b) a cathode for providing said oxygen ions derived from gaseous molecular oxygen flowing in a second flow path through a second portion of said cell; and c) a solid oxide electrolyte separating said anode from said cathode, wherein said electrical resistance is non-uniform over one of said anode, cathode, and electrolyte.

* * * * *